Sept. 20, 1955 W. H. HOWE 2,718,620
MEANS FOR MEASUREMENT BY ELECTRICAL
CONDENSER OF CHARACTERISTICS AND
CONDITIONS OF MATERIAL
Filed Sept. 11, 1952 5 Sheets-Sheet 1
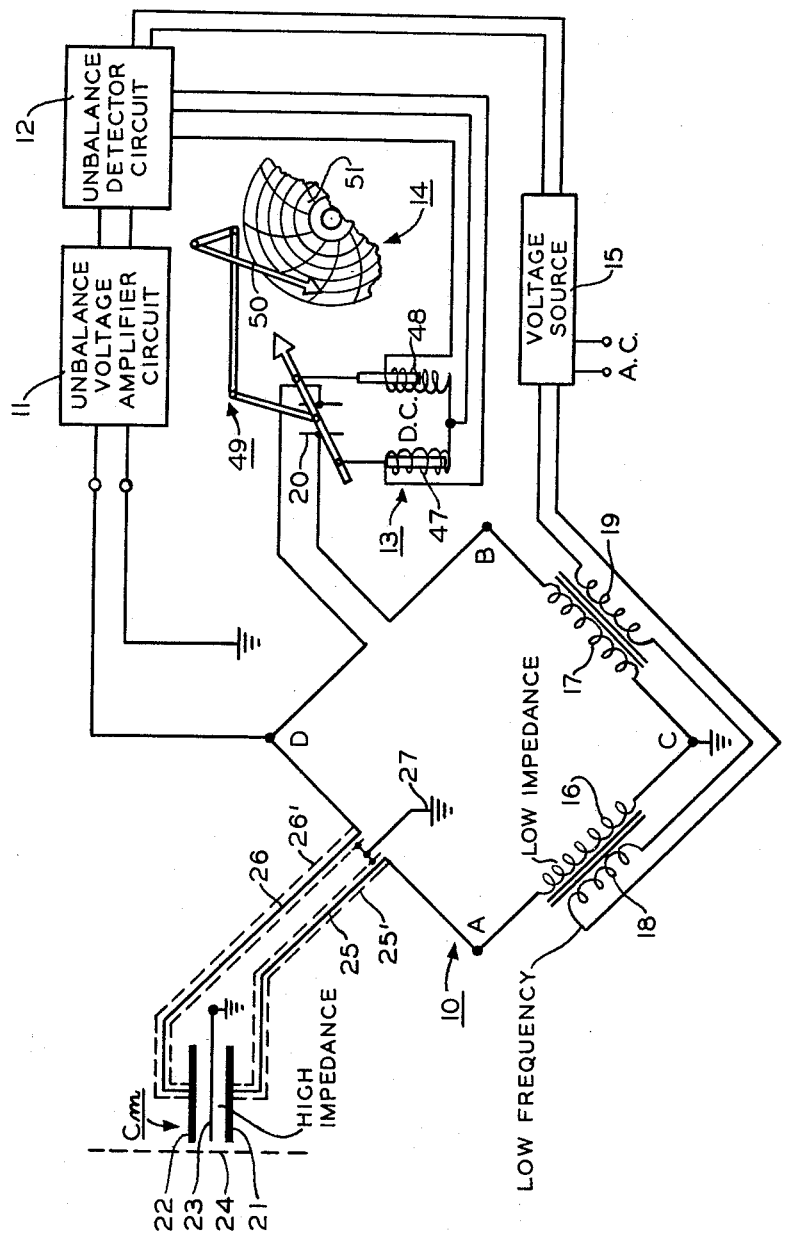
FIG. I
INVENTOR.
WILFRED H. HOWE
BY
Curtis, Morris + Safford
ATTORNEYS

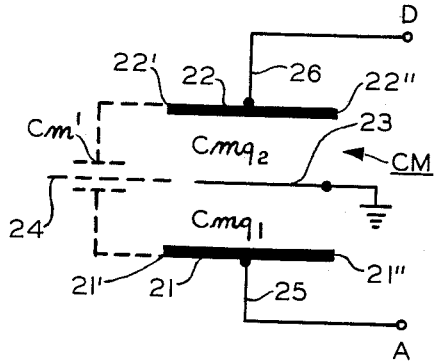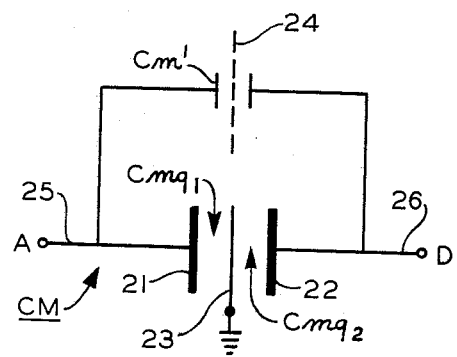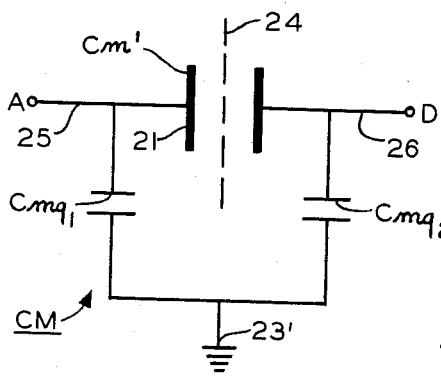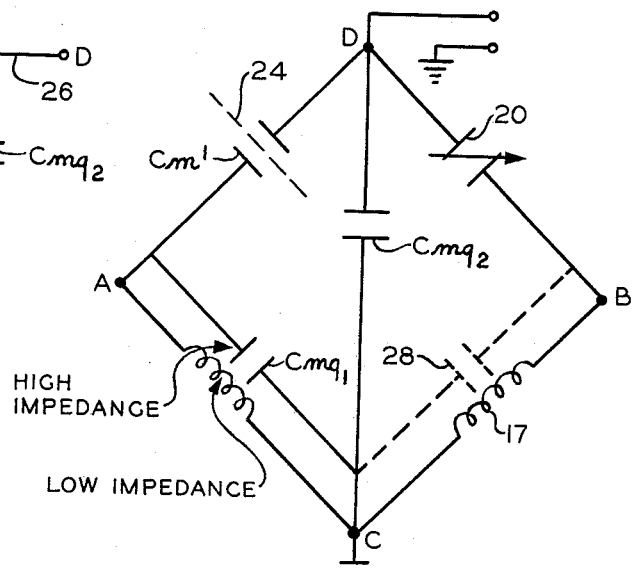

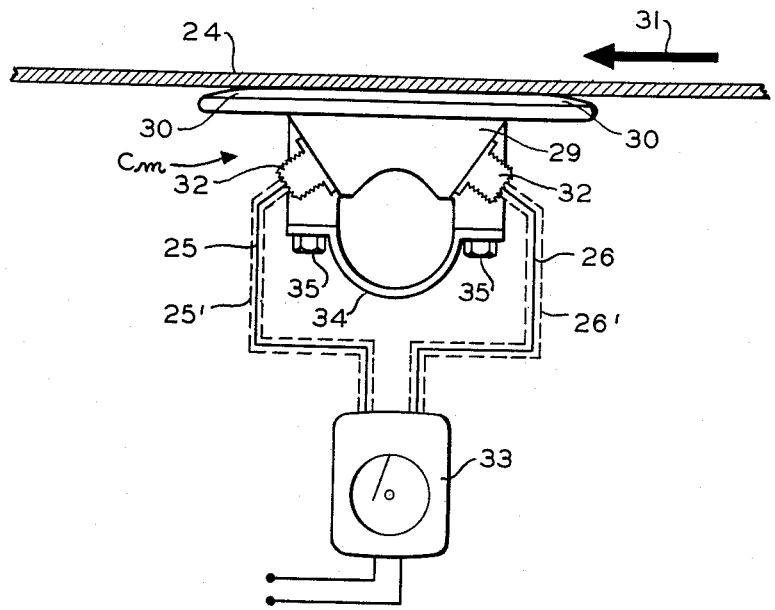
FIG. VI
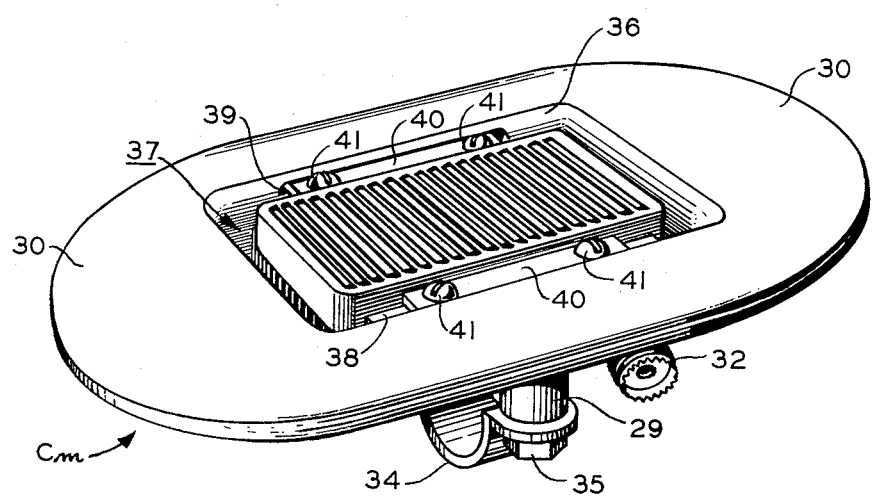
FIG. VII
INVENTOR.
WILFRED H. HOWE

Sept. 20, 1955    W. H. HOWE    2,718,620
MEANS FOR MEASUREMENT BY ELECTRICAL
CONDENSER OF CHARACTERISTICS AND
CONDITIONS OF MATERIAL
Filed Sept. 11, 1952    5 Sheets-Sheet 4
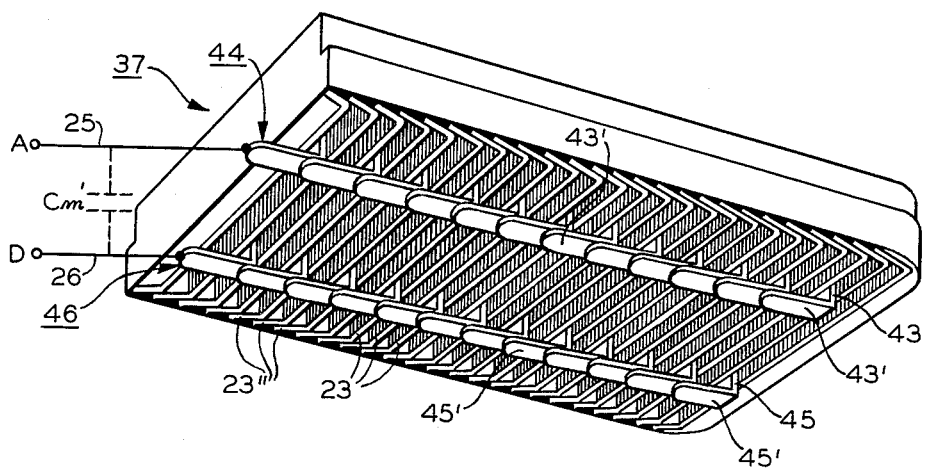
FIG. VIII
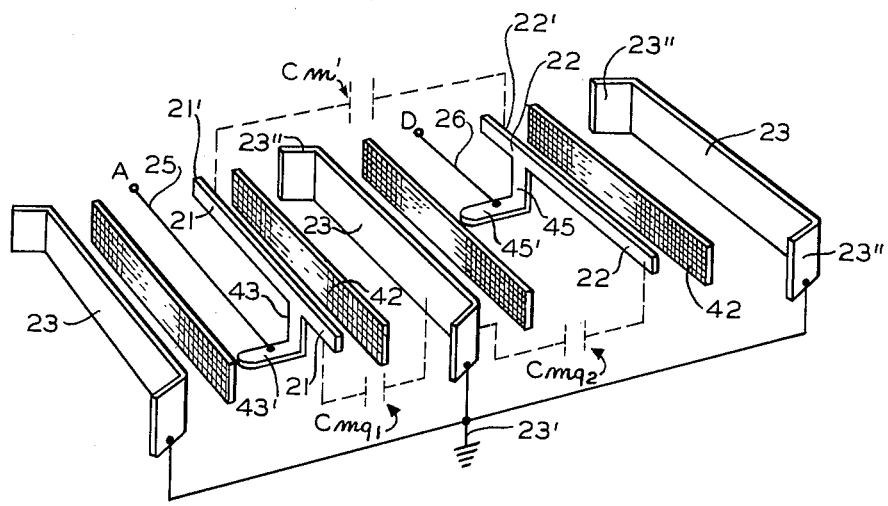
FIG. IX
*INVENTOR.*
WILFRED H. HOWE
BY
*Curtis, Morris + Safford*
*ATTORNEYS*

Sept. 20, 1955     W. H. HOWE     2,718,620
MEANS FOR MEASUREMENT BY ELECTRICAL
CONDENSER OF CHARACTERISTICS AND
CONDITIONS OF MATERIAL
Filed Sept. 11, 1952     5 Sheets-Sheet 5
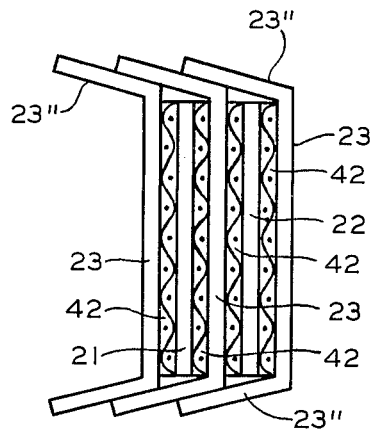
FIG. X
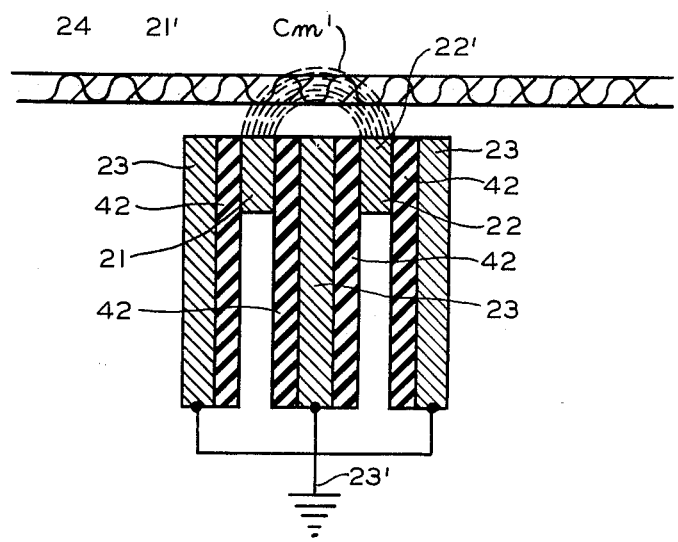
FIG. XI
*INVENTOR.*
WILFRED H. HOWE
BY
Curtis, Morris + Safford
*ATTORNEYS*

United States Patent Office 2,718,620
Patented Sept. 20, 1955

2,718,620

MEANS FOR MEASUREMENT BY ELECTRICAL CONDENSER OF CHARACTERISTICS AND CONDITIONS OF MATERIAL

Wilfred H. Howe, Sharon, Mass., assignor to The Foxboro Company, Foxboro, Mass.

Application September 11, 1952, Serial No. 309,046

5 Claims. (Cl. 324—61)

This invention relates to measuring systems in which an electrical capacitor is used as the sensing element by which the value of an unknown condition is determined. More particularly this invention relates to systems in which the fringe capacitance of the measuring capacitor serves as a measure of the condition being tested.

Capacitors formed by two spaced plates have been used in the manufacture of paper, textiles, and other materials to measure the moisture content so that products of uniform quality will be produced. In these earlier systems, the two plates of the capacitor were placed on opposite sides of the moving web of material being tested: the variations in capacitance between the plates served as an indication of the variations in the moisture content of the material. Such condensers also have been used in the control of thickness and other properties in order to produce products having uniform characteristics. There are, however, a number of important disadvantages and limitations of such capacitance measuring systems. For example, where the web of material being measured is wide, a relatively large and unwieldy structure is necessary if the capacitance variations of the center portion of the web are to be included in the measurements. Moreover, variations in the distance between the capacitor plates, for example, as a result of temperature changes or pressure being exerted on one of the plates by the material being tested, introduces significant errors.

The use of such systems has been limited further because the spacing of the capacitor plates limits the thickness of the material to be tested. In some control applications, moisture or other foreign material collecting on the plates would introduce errors making it necessary to stop production while the plates were being cleaned or dried.

These disadvantages can be overcome to a large extent by the use of a capacitor sensing element positioned entirely on one side of the material being tested. For example, if the edges of the plates of a capacitor are placed adjacent the surface of the material, changes in the dielectric characteristics of the material will affect the capacitance between the condenser plates even though none of the material is between the plates. This change in capacity is caused by the "fringe effect," that is, the electrostatic field between the plates bulges out along the edges of the condenser plates: any change in the dielectric constant of material in this "spray field" will change the capacitance between the plates.

However, this spray field ordinarily is associated with only a small part of the total capacitance of the condenser. For example, the "spray field" might account for ten per cent of the total capacitance of the measuring condenser. If the material being tested produced a maximum change of ten per cent in the dielectric constant of this spray field this would change the total capacitance of the condenser by only one per cent. Thus, any error, such as would be caused by temperature changes or other factors, which changed the total capacitance of the condenser by as much as one per cent would substantially mask the variations in capacitance produced by the material being measured. Much smaller variations in the capacitance of the main body of the condenser would produce serious errors in the measurements.

The present invention is directed to an improved capacitance measuring system based on the use of the fringe field and in which the capacitance of the main body of the capacitor is divided and rendered ineffective in such manner that the accuracy of the measuring system is not affected significantly by variations in the capacitance of the condenser apart from the fringe capacity. In a preferred embodiment of the invention, an especially constructed condenser having electrostatic shielding between adjacent condenser plates is connected to a balanceable network in such manner that the main capacitance associated with the electrostatic field directly between the plates is cancelled out so that the primary changes in the indications of the measuring system are produced solely by changes in the fringe capacitance of the condenser.

It is, therefore, an object of this invention to provide new and improved means for measurement by electrical condenser of characteristics and conditions of material.

Other objects and advantages of this invention will be in part apparent and in part pointed out hereinafter.

As an illustrative embodiment of this invention, a particular instrument and condenser measuring head is described herein and shown in the accompanying drawings. The instrument measures characteristics and conditions of material, for example, moisture content of paper in the process of manufacture, and records the results of its measurement on a rotating chart. The condenser head is used as a sensing element to respond to the characteristics or conditions being measured.

In the drawings:

Figure I is a schematic showing of an instrument in illustrative embodiment of this invention;

Figure II is a schematic showing of the measuring condenser of Figure I;

Figure III is a circuit showing in explanation of the condenser of Figures I and II;

Figure IV is a circuit showing as another step in the explanation of the condenser of Figures I and II;

Figure V is a circuit showing as the final step in the explanation of the condenser of Figures I and II;

Figure VI is a structural showing in elevation, of a measuring condenser unit in association with a measuring instrument;

Figure VII is a perspective of the measuring condenser unit of Figure VI;

Figure VIII is a perspective of the condenser plate assembly of the unit of Figure VII;

Figure IX is an exploded view of a portion of the structure of Figure VIII;

Figure X is a top plan view enlargement of portions of the condenser electrode plate assembly of Figure VIII; and Figure XI is a showing in cross-section form, of the assembled relation of portions of the condenser electrode plate assembly of Figure VIII.

In Figure I, at the upper left, a measuring condenser unit $Cm$ is shown. The instrument of which $Cm$ is a part comprises, generally, a balanceable electrical bridge 10 with $Cm$ forming one arm of the bridge, and in the output of the bridge, an unbalance voltage amplifier circuit 11 and an unbalance detector circuit 12. Further, the output of the detector 12 operates a bridge rebalancing arrangement 13 and a recording arrangement 14. The instrument is powered from a voltage source 15. The general form and arrangement of circuitry with which this invention is concerned is illustrated in my copending application for Measuring Apparatus, filed December 28, 1945, Serial Number 637,733. In particular, acceptable circuitry may be found in this copending application for the amplifier and detector 11 and 12, and the voltage source 15, of the present application.

The bridge circuit 10 is a modified A. C. type with one arm provided with a low impedance coil 16 and an adjacent arm with a matching coil 17. The excitation of the bridge is through these inductances by way of exciter coils 18 and 19 which are energized from the voltage source 15, preferably at a low frequency of the order of 1000 C. P. S. Thus the effect is similar to energizing the bridge across the nonadjacent ends of the inductances 16 and 17, that is, across bridge arm junction points A and B. The bridge arm junction C, between the excitation coils 16 and 17, is connected to a common ground circuit that may or may not be connected to earth. The measuring condenser unit $Cm$ forms another arm of the bridge, adjacent to the low impedance coil 16, and the final arm of the bridge is in the form of a balancing condenser 20. The remaining bridge arm junction is at D, between the balancing condenser 20 and the measuring condenser unit $Cm$.

Thus the points of bridge unbalance output are at C and D, that is, ground and D.

The measuring condenser unit $Cm$ has electrodes in the form of opposed condenser plates 21 and 22, and a grounded electrostatic shield 23 therebetween. The material under measurement is represented by the dash line 24. This material is passed through the edge area of the condenser, in the electrostatic spray field thereof. The condenser measuring head $Cm$ often necessarily is at some distance from the instrument in order to be located properly with respect to the material under measurement. Accordingly, each plate of the condenser is provided with a lead, as at 25 and 26, with electrical shields 25' and 26' thereon to prevent disturbance of the condenser output by extraneous influences. These shields are shown as leading to the bridge proper as an indication that they extend to the housing of the instrument as a ground 27. The shields are not connected to the condenser plates.

Figures II through V are in explanation of the electrical action and effect of the structure comprising the measuring condenser unit $Cm$. Figure II shows the condenser plates 21 and 22 opposed and parallel with the grounded electrostatic shield 23 midway therebetween and in parallelism therewith. The shield 23 in this view is coextensive with the plates 21 and 22 along the edge adjacent the material to be tested but in other directions extends well beyond the plates 21 and 22. The main effect and purpose of the shield 23 is to electrically isolate the effect of the electrostatic spray field of the unit $Cm$ with respect to the effect of the main electrostatic condition directly between the plates 21 and 22. The capacitance of the electrostatic spray field is represented by the dotted line condenser $Cm'$, shown as a capacitance between opposed edge portions 21' and 22' of the plates 21 and 22. The shield 23 prevents the forming of an electrostatic spray field between the plates 21 and 22 by way of their edge portions except as at 21' and 22' where the shield is flush with the plate edges and the spray field capacitance $Cm'$ exists. With respect to the other end of the shield 23 and the condenser plate edges 21" and 22" associated therewith, spray field capacitance is blocked by the extension of the shield beyond the plates. As will be seen in the actual structure of the measuring condenser unit $Cm$, the remaining edge portions of the plates 21 and 22 are also separated by the shield 23 so as to prevent the forming of an electrostatic spray field therebetween. The result of this arrangement is to shield the plates 21 and 22 from each other except at the edge portions 21' and 22' where the spray field capacitance $Cm'$ exists. The material 24 to be measured is shown as in effect being placed between the plates of the condenser $Cm'$.

This arrangement accomplishes the first step in electrically isolating the effect of $Cm'$ with respect to the effect of the main electrostatic condition directly between the plates 21 and 22. The shield 23 establishes new and grounded capacitances $Cmg_1$ and $Cmg_2$ in the circuit as between the shield and each plate. The shield 23 and its location may therefore be considered as a factor in the electrical isolation of the effect of the spray field capacitance $Cm'$ with respect to the effect of the electrostatic condition directly between the plates 21 and 22.

The purpose in isolating the effect of the capacitance $Cm'$ is to allow changes in $Cm'$ to affect the bridge circuit without being hampered by the masking effect thereon which would ordinarily be the result of the electrostatic condition directly between the plates 21 and 22 of the unit $Cm$. The new capacitances $Cmg_1$ and $Cmg_2$ thus formed between the shield and the condenser plates should have no significant operative effect on the bridge circuit. In other words, it is desirable that in so far as the bridge sees the measuring unit $Cm$, it sees only the capacitance $Cm'$. A percentage change in $Cm'$ as produced by the material to be measured, as the bridge sees it, is for practical purposes the same percentage change in the whole output of the entire unit $Cm$.

The capacitances $Cmg_1$ and $Cmg_2$ are connected in the bridge circuit as to make these capacitances substantially ineffective with respect to balance or unbalance of the bridge. These connections are illustrated and explained in relation to Figures III through V.

In Figure III the elements of Figure II are shown in the same electrical relation, but a different arrangement emphasizing the isolation of the effect of $Cm'$ with respect to the effect of the electrostatic condition directly between the plates 21 and 22, and showing that by using the shield 23 the effect of three separate condensers is produced, $Cm'$, $Cmg_1$, and $Cmg_2$.

In Figure IV the elements of Figure II are further rearranged, showing $Cm'$ as the main effective part of the unit $Cm$, and the capacitances $Cmg_1$ and $Cmg_2$ as two separate condensers. The ground connection 23' is the shield ground of Figure II. Further, the capacitances $Cmg_1$ and $Cmg_2$ are shown as capacitances to ground from the bridge arm A—D as an indication of how these capacitances are rendered substantially ineffective in the operation of the bridge circuit.

In Figure V, the elements of Figure II are shown in arrangement with the bridge circuit as they are connected therein and in illustration of their effect or lack of effect on the operation of the bridge. In this figure, $Cm'$ the spray field capacitance, is shown as forming one arm of the bridge, as in operation is the actual condition. The capacitance $Cmg_1$ is connected across the coil 16, in parallel therewith, and is effectively in series relation with the measuring capacitance $Cm'$. The impedance relation of the capacitance $Cmg_1$ to the capacitance $Cm'$ and to the inductance of the coil 16 nullifies any practical effect of $Cmg_1$ on the bridge circuit. The capacitance $Cmg_1$, at the operating frequency (1000 C. P. S.) has a high impedance with respect to the coil 16. In its series relation with $Cm'$, the capacitance $Cmg_1$ has relatively low impedance and its effect on the bridge operation is therefore negligible in comparison to the effect of $Cm'$. Also, in its parallel relation with the coil 16 the capacitance $Cmg_1$ has relatively high impedance and its effect on the bridge operation is therefore negligible in comparison to the effect of the coil 16. Other operating frequencies may be used as long as the above impedance and series-parallel relations are maintained.

The above arrangement may be seen in Figure I where $Cmg_1$ is the capacitance between the plate 21 and the shield 23. Plate 21 is directly connected to one side of the coil 16 through the lead 25, and the shield 23 is grounded. Since the bridge arm junction C is grounded, the effect is to connect the shield 23 to the arm junction C and therefore to connect $Cmg_1$ across the low impedance coil 16. In this relation to the bridge circuit the capacitance $Cmg_1$ has no practical effect on the operation of the bridge. The bridge acts practically as if the capacitance $C_{mg_1}$ were not there at all.

The capacitance $C_{mg_2}$, as in Figure V, as in effect connected between the bridge arm junctions C and D. This arrangement may be seen in Figure I where $C_{mg_2}$ is the capacitance between plate 22 and the shield 23. The plate 22 is directly connected to the bridge arm junction D through the lead 26, and, as before, the shield 23 is grounded and the effect is to connect the shield 23 to the bridge arm junction C. Thus the capacitance $C_{mg_2}$ is connected across the bridge output take off points C and D. When the bridge is balanced, the potential across the output is zero, and therefore the potential on the capacitance $C_{mg_2}$ is zero. In the operation of the bridge, the unbalance is small, and the departure from zero potential across the output points C and D is also small. Therefore, within the working range of the instrument, the potential on the capacitance $C_{mg_2}$ is small and negligible in its effect on the operation of the bridge in comparison to the effect of the measuring capacitance $C_m'$.

If desired, with respect to the bridge arm B—C, a capacitance 28 may be connected across the excitation coil 17, as a balance for the capacitance $C_{mg_1}$ across the coil 16, to avoid undesirable effects due to phase shift.

Thus the isolation of the effect of the spray field capacitance $C_m'$ with respect to the effect of the electrostatic condition directly between the $C_m$ unit plates 21 and 22 is completed by the two steps, first by using the shield 23 as shown and described, and second by connecting the capacitances $C_{mg_1}$ and $C_{mg_2}$ in the bridge circuit so that they have no practical effect on the operation of the bridge. Very substantial variations of $C_{mg_1}$ and/or $C_{mg_2}$ make no change in this condition.

Accordingly changes in the capacitance of $C_m'$ caused by changes in the characteristics of the material being measured are the only changes in the capacitance of $C_m$ that have any significant effect on the balance condition of the bridge, and the electrostatic condition directly between the $C_m$ plates 21 and 22 has no appreciable masking effect on the spray field capacitance $C_m'$.

Figure VI through XI are illustrative of the structure of the measuring condenser unit $C_m$. As in Figure VI, the unit is provided with a housing 29 which has a generally oval surface 30 thereon, over which the material 24 may pass in the direction, for example, of the arrow 31. The surface 30 is smooth, and curved outwardly and downwardly in all directions, away from the material 24. While contact between the material 24 and the surface 30 is not required in the operation of this device, as a matter of practice such contact is used with materials which are not changed or injured by the contact. If pressures on the material are desirable, they will not affect the operation of the measuring condenser of this invention, within structural pressure limits. The housing 29 is provided with outlet plugs 32 through which the condenser leads 25 and 26 extend as connections to the measuring and recording instrument 33. The grounded shields 25' and 26' for the condenser leads are shown as dotted lines parallel to the leads. Means for mounting the condenser unit $Cm$ is provided in the form of a clamp 34 held to the housing 29 by bolts 35. The clamp 34 may be used to grasp any suitable support, such as a pipe or bracket.

Figure VII shows the condenser unit $Cm$ in a view showing the curved face 30 of the housing 29. A recess 36 is formed in the housing 29 with a generally rectangular rounded edge opening through the face 30. A rectangular condenser plate assembly 37 is located and bottomed in the recess 36, with one side flush with the edge of the housing opening.

As a means of mounting the plate assembly 37 in the housing 29, shoulders 38 are provided on the side edges of the plate assembly and slots 39 are provided in the walls of the housing recess 36. Holding strips 40 rest on the shoulders 38 and in the slots 39, and are secured by screws 41.

In Figure VIII the condenser plate assembly 37 is shown removed from the condenser housing 29 of Figure VII, and is viewed from the under side. One of the holding shoulders 38 may be seen in this view. The condenser assembly as may be seen in Figure IX is made up of a number of pairs of narrow condenser plates, see 21 and 22 as in Figures I and IX separated by insulation strips 42 and shield strips 23 as the structure represented by the shield 23 of Figure I. This group of parts is duplicated many times and closely joined to form the composite condenser shown in Figure VIII. All condenser plates 21 have electrical connection legs 43 depending therefrom with uniformly bent ends 43', and all the legs 43 are electrically connected as a bar 44, formed by nesting and joining the leg ends 43', which terminates in a connection to the lead 25 and the Figure I bridge arm junction A. Similarly all condenser plates 22 have electrical connection legs 45 depending therefrom with uniformly bent ends 45', and all the legs 45 are electrically connected as a bar 46, formed by nesting and joining the leg ends 45', which terminates in a connection to the lead 26 and the Figure I bridge arm junction D. The shield strips 23 are formed with wing ends 23'' all bent in the same horizontal direction and to the same angle. These strips are assembled by nesting the wing ends 23'' and joining these ends electrically and structurally. Thus the plate assembly 37 comprises three distinct unitary structures plus the individual insulation strips located as shown in Figure IX. One structure comprises the series of condenser plates 21 all joined by the bar 44, another structure comprises the series of condenser plates 22 all joined by the bar 46, and the third structure is the series of shield strips 23, joined together at their ends by nesting the folds 23'' and soldering or otherwise structurally and electrically making a shield unit.

In the process of assembly, the parts are arranged in the order and relative positions illustrated in Figure IX. Then they are pressed together to nest the shield strips 23, and the plate leg ends 43' and 45'. In the final assembly the condenser plate structures and the insulation strips are firmly held, by friction and lateral pressure, between the pressed-together shield strips 23.

The Figure VIII and with reference to Figure II the spray field capacitance $Cm'$ is shown in dotted lines between the leads 25 and 26 as related to the condenser plate bars 44 and 46. In Figure IX the spray field capacitance $Cm'$ is shown in dotted lines between the condenser plate edges 21' and 22'. Further, the capacitance $Cmg_1$ is shown in dotted lines between the condenser plate 21 and the shield 23, and the capacitance $Cmg_2$ is shown in dotted lines between the condenser plate 22 and the shield 23. Also the shield strips 23 are shown as being grounded at 23', as in Figure IV, this ground being the housing of the condenser unit $Cm$.

Figure X shows the parts of Figure IX in assembled relation, in a view of the top, or measured material contacting edges of the condenser plates 21 and 22. This view illustrates the nesting assembly of the shield strips 23 by means of their end wings 23''. In this view it is clear that the condenser plates 21 and 22 are separated and shielded from each other at their ends by the nesting shield strip wings 23''.

Figure XI also shows the parts of Figure IX in assembled relation in a cross-section form of illustration. The spray field capacitance $Cm'$ is shown as arched dotted lines between the edges 21' and 22' of the condenser plates 21 and 22. All the parts are flush at the top, providing a single smooth surface as the material engaging face of the condenser plate assembly 37, Figures VII and VIII. The shield strips 23 extend downwardly well beyond the lower edges of the condenser plates, and spray field capacitance is thus prevented at these edges as between the plates 21 and 22. Thus all portions of the condenser plates are shielded except the edges 21' and 22', as a step or factor in the electrical isolation of the effect of the spray field capacitance $Cm'$ with respect to the effect of the electrostatic condition directly between the condenser plates.

Referring to Figure I and the instrument as a whole, the operation and structure of the condenser measuring unit $Cm$ and the bridge 10 have been described and the bridge unbalance output take-off points have been established as at the bridge arm junctions D and C, or the equivalent, D and ground. This output is applied to the amplifier 11 and the detector 12 as previously set forth herein. The output of the detector 12 is direct current whereas alternating current is used to excite the bridge. This D. C. output of the detector 12 is applied to the bridge rebalancing arrangement 13 which comprises a pair of solenoids 47 and 48. When the bridge circuit is unbalanced, one or the other of these solenoids receives increased current and the arm 20 is moved in a direction depending on the phase of the bridge unbalance as determined by the detector 12. As the arm of the solenoid motor is moved, the variable rebalance condenser 20 is adjusted as a compensation for the bridge unbalance. The movement thus produced in the condenser 20 is taken off through a linkage 49 and applied to a pen 50 mounted for generally radial movement across the face of a rotating chart 51 in the usual and known manner, to produce a record representative of the value of the condition or characteristic measured by the instrument through the measuring condenser $Cm$ as a sensing element.

From the foregoing it will be seen that this invention provides new and novel means of measuring characteristics and conditions of material through the use of an electrical condenser as a sensing element, with particular reference to such measurement means in which the measurement is made by placing the material in the electrostatic spray field in the edge area of such condensers.

As many embodiments may be made of the above invention and as changes may be made in the embodiments above set forth without departing from the scope of the invention, it is to be understood that all matter hereinbefore set forth or shown in the accompanying drawings is to be interpreted as illustrative and not in a limiting sense.

I claim:

1. For use as a sensing arrangement in an instrument for the measurement of characteristics and conditions of material, a balanceable electrical circuit, a pair of output terminal connections in said circuit, one of said output terminal connections being connected to a common ground circuit, a first portion of said circuit formed with a predetermined relatively low impedance and having a terminal connected to said grounded output terminal connection, a second portion of said circuit connected between said first portion and the other of said circuit output terminal connections, and a sensing element in said second portion, said sensing element being in the form of an electrical condenser unit comprising two electrodes in a structure for establishing an electrostatic spray field condition from one of said electrodes to the other of said electrodes to provide a measuring field, an electrical shield between said electrodes, and a ground connection to said shield, with said shield and one of said electrodes providing a capacitance of relatively high impedance, said capacitance being connected to apply its full effect in said circuit across said first circuit portion and said relatively high impedance being sufficiently large compared to said relatively low impedance to provide the result that variations of said capacitance have a negligible effect on the performance of the circuit as a whole and specifically on the unbalance of said balanceable circuit, and said shield and the other of said electrodes providing another capacitance, said other capacitance being connected across said circuit output terminals, to the overall effect that variations in capacitance of said electrode to shield capacitances have negligible masking effect upon variations of said measuring spray field.

2. For use as a sensing arrangement in an instrument for the measurement of characteristics and conditions of material, a balanceable electrical circuit, a pair of output terminal connections in said circuit, one of said output terminal connections being connected to a common ground circuit, a first arm of said circuit formed with a predetermined relatively low impedance and having a terminal connected to said grounded output terminal connection, a second arm of said circuit connected between said first arm and the other of said circuit output terminal connections, a sensing element in said second arm, said sensing element being in the form of an electrical condenser unit comprising two electrodes in a structure for establishing an electrostatic spray field condition from one of said electrodes to the other of said electrodes to provide a measuring field, an electrical shield between said electrodes, and a ground connection to a said shield, with said shield and one of said electrodes providing a capacitance of relatively high impedance, said capacitance being connected to apply its full effect in said circuit across said first arm, and said relatively high impedance being sufficiently large compared to said relatively low impedance to provide the result that variations of said capacitance have a negligible effect on the performance of the circuit as a whole and specifically on the unbalance of said balanceable circuit, and said shield and the other of said electrodes providing another capacitance, said other capacitance being connected across said circuit output terminals, a third arm of said bridge formed with a predetermined relatively low impedance, a rebalance element in a fourth arm of said bridge, and means coupled to said rebalance element and responsive to the unbalance potential between said output terminals to vary said rebalance element to minimize said unbalance potential, whereby the unbalance potential of said balanceable circuit tends to be continuously maintained at a negligible potential, thereby providing a negligible potential across said capacitance between said shield and said other electrode, to the overall effect that variations in capacitance of said electrode to shield capacitances have negligible masking effect upon variations of said measuring spray field.

3. In an instrument for the measurement of characteristics and conditions of material, a balanceable electrical circuit, a pair of output terminal connections in said circuit, one of said output terminal connections being connected to a common ground circuit, a first arm of said circuit formed with a predetermined, relatively low impedance and having a terminal connected to said grounded output terminal connection, a second arm of said circuit connected between said first arm and the other of said circuit output terminal connections, a sensing element in said second arm, said sensing element being in the form of an electrical condenser unit comprising two electrodes in a structure for establishing an electrostatic spray field condition from one of said electrodes to the other of said electrodes to provide a measuring field, an electrical shield between said electrodes, and a ground connection to said shield, with said shield and one of said electrodes providing a capacitance of relatively high impedance, said capacitance being connected to apply its full effect in said circuit across said first arm, and said relatively high impedance being sufficiently large compared to said relatively low impedance to provide the result that variations of said capacitance have a negligible effect on the performance of the circuit as a whole and specifically on the unbalance of said balanceable circuit, and said shield and the other of said electrodes providing another capacitance, said other capacitance being connected across said circuit output terminals, a third arm of said bridge formed with a predetermined relatively low impedance, a rebalance element in a fourth arm of said bridge, and amplification and phase detection means coupled to said rebalance element and responsive to the unbalance potential between said output terminals to vary said rebalance element to minimize said unbalance potential and to provide an output action for purposes of indicating, recording, or controlling, with respect to the measured material, whereby the unbalance potential of said balanceable circuit tends to be maintained continuously at a negligible potential, thereby providing a negligible potential across said capacitance between said shield and said other electrode, to the overall effect that variations in capacitance of said electrode to shield capacitances have negligible masking effect upon variations of said measuring spray field.

4. In an instrument for the measurement of characteristics and conditions of material, a balanceable electrical circuit, a pair of output terminal connections in said circuit, one of said output terminal connections being connected to a common ground circuit, a first arm of said circuit formed with a predetermined, relatively low impedance and having a terminal connected to said grounded output terminal connection, a second arm of said circuit connected between said first arm and the other of said output terminal connections, a sensing element in said second arm, a shoe-like housing for said sensing element, a face on said housing across which the material to be measured is passed, with said housing having a recess therein opening on said face, and said face being generally oval, and convex in relation to the material to be measured, said sensing element being in the form of an electrical condenser unit mounted in said housing recess and comprising a series of electrodes in a structure for establishing electrostatic spray field conditions from one to the other of adjacent electrodes, said electrodes being electrically connected in two groups, each group comprising one side of the condenser in the unit as a whole with adjacent electrodes being in different groups, an electrical shield structure comprising a series of shield members joined for electrical conduction from member to member, one of said shield members being disposed between each pair of adjacent electrodes, and a ground connection to said shield structure with said shield structure and one of said electrode groups providing a capacitance of relatively high impedance, said capacitance being connected to apply its full effect in said circuit across said first arm, and said relatively high impedance being sufficiently large compared to said relatively low impedance to provide the result that variations of said capacitance have a negligible effect on the performance of the circuit as a whole and specifically on the unbalance of said balanceable circuit, and said shield structure and the other of said electrode groups providing another capacitance, said other capacitance being connected across said circuit output terminals, a third arm of said bridge formed with a predetermined relatively low impedance, a rebalance element in a fourth arm of said bridge, and amplification and phase detection means coupled to said rebalance element and responsive to the unbalance potential between said output terminals to vary said rebalance element to minimize said unbalance potential and to provide an output action for purposes of indicating, recording, or controlling, with respect to the measured material, whereby the unbalance potential of said balanceable circuit tends to be maintained continuously at a negligible potential, thereby providing a negligible potential across said capacitance between said shield structure and said other of said electrode groups to the overall effect that variations in capacitance of said electrode group to shield structure capacitances have negligible masking effect upon variations of said measuring spray field.

5. For use as a sensing element in an instrument for the capacitive measurement of characteristics and conditions of material placed near to one side of the sensing element, an electrical condenser unit comprising a housing having a centrally-located recess and a flange projecting outwardly on all sides from the perimeter of said recess, said flange providing a rounded convex face surrounding the recess and projecting outwardly and downwardly from all edges of the perimeter whereby material under measurement can be moved across said recess while being supported on all sides thereof by the convex surface of said face, a first group of relatively long and narrow condenser plates parallelly mounted within said recess and each having a first one of its long edges coplanar with the corresponding edges of the other plates in said first group and substantially flush with the perimeter of said recess, a second group of relatively long and narrow condenser plates arranged alternately with the plates of said first group and parallel thereto each having a first one of its long edges coplanar with the corresponding edges of the plates in said first group, a third group of relatively long and wide electrically-conductive shield strips parallelly mounted and arranged alternately with the condenser plates of both said first and second groups, each of said shield strips having a first one of its long edges coplanar with the corresponding first long edges of all of the condenser plates, each of the second long edges of said shield strips projecting a substantial distance below the second long edges of all of said condenser plates whereby the second long edges of said condenser plates are electrostatically isolated from each other by said projecting second edges of said shield strips, a pair of wing ends on each of said shield strips, all of said wing ends on the corresponding ends of said shield strips being bent in the same direction and at the same angle whereby said wing ends nest together in contact with one another electrically to connect all of said shield strips, whereby the ends of said condenser plates are electrostatically isolated from each other by the wing ends of said shield strips, insulation spacing means between adjacent condenser plates and shield strips, first conductive means connecting all of the condenser plates of said first group, and second conductive means connecting all of the condenser plates of said second group.

References Cited in the file of this patent

UNITED STATES PATENTS

| | | |
|---|---|---|
| 1,984,166 | Walter | Dec. 11, 1934 |
| 2,285,152 | Firestone | June 2, 1942 |
| 2,428,700 | Eilenberger | Oct. 7, 1947 |
| 2,476,496 | Kliever | July 19, 1949 |
| 2,535,027 | Anderson | Dec. 26, 1950 |
| 2,618,157 | Keeling | Nov. 18, 1952 |